United States Patent [19]
Schaan

[11] Patent Number: 5,664,444
[45] Date of Patent: Sep. 9, 1997

[54] LOCKING DEVICE FOR A HELMET

[76] Inventor: Kerry R. Schaan, 7328-61 Avenue NW, Calgary Alberta, Canada, T3B 3W8

[21] Appl. No.: 609,474

[22] Filed: Mar. 1, 1996

[51] Int. Cl.⁶ ........................................ E05B 73/00
[52] U.S. Cl. ............................ 70/14; 70/18; 70/59
[58] Field of Search ........................ 70/14, 18, 19, 70/57–59

[56] References Cited

U.S. PATENT DOCUMENTS

| | | | |
|---|---|---|---|
| 2,462,951 | 3/1949 | Doubble | 220/85 |
| 2,526,238 | 10/1950 | Kendall | 138/89 |
| 3,529,451 | 9/1970 | McOsker et al. | 70/59 |
| 3,895,507 | 7/1975 | Moy | 70/177 |
| 4,274,271 | 6/1981 | Todd et al. | 70/59 |
| 4,399,893 | 8/1983 | Switzer | 70/14 X |
| 4,418,550 | 12/1983 | Hamilton | 70/18 |
| 4,419,872 | 12/1983 | Plifka | 70/57 X |
| 4,538,435 | 9/1985 | Romero | 70/183 |
| 4,676,080 | 6/1987 | Schwarz | 70/59 |
| 4,956,982 | 9/1990 | Valley | 70/59 |

FOREIGN PATENT DOCUMENTS 2370622  7/1978  France ................................. 70/59

*Primary Examiner*—Suzanne Dino

[57] ABSTRACT

A T-bar shaped portion that has a first flat bar with a second flat bar fixedly attached. The first flat bar has a generally rectangular shape. The second flat bar has a generally rectangular shape with a width equal to the width of the first bar. The length of the second flat bar is one third greater than the length of the first flat bar. The second flat bar is centrally positioned on a top surface of the first bar and integral thereto. An opening is positioned through a free end of the second flat bar. Lastly, the free end of the second flat bar is positioned through a ventilation hole of a helmet. The opening within the free end has a pad lock positioned therethrough for positioning around a bicycle frame.

1 Claim, 2 Drawing Sheets

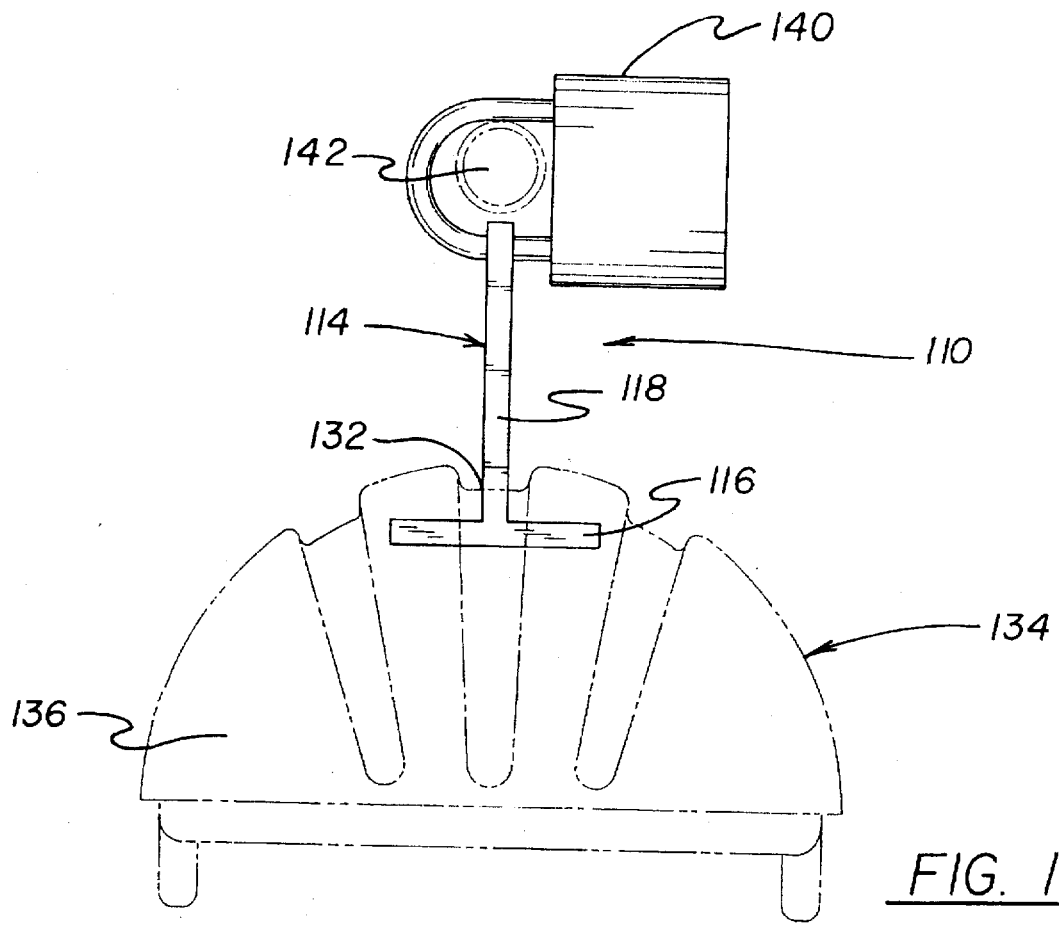
FIG. 1
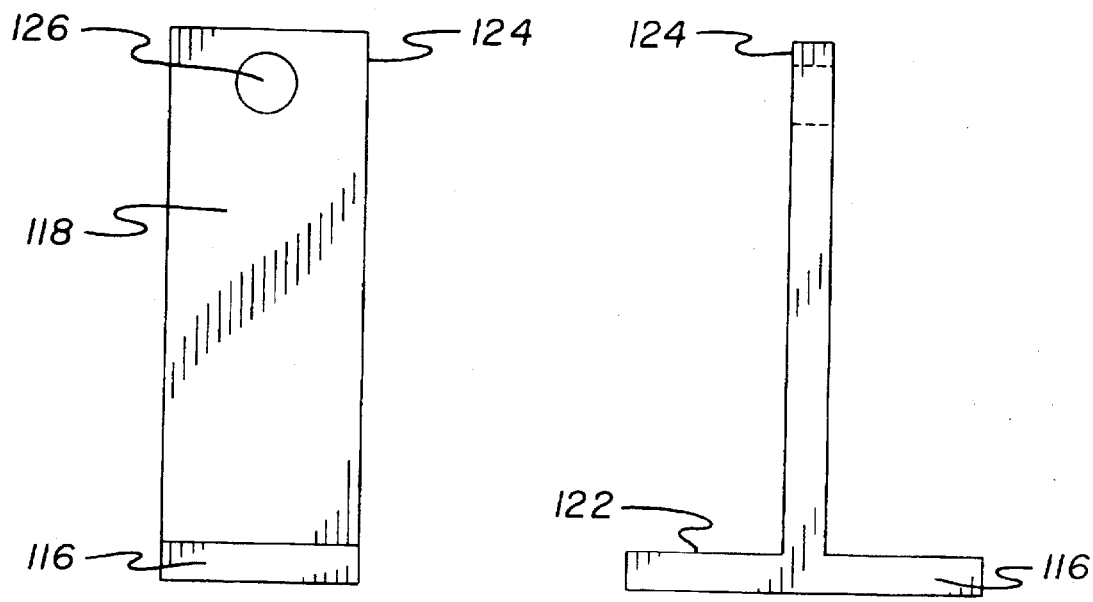
FIG. 2
FIG. 3

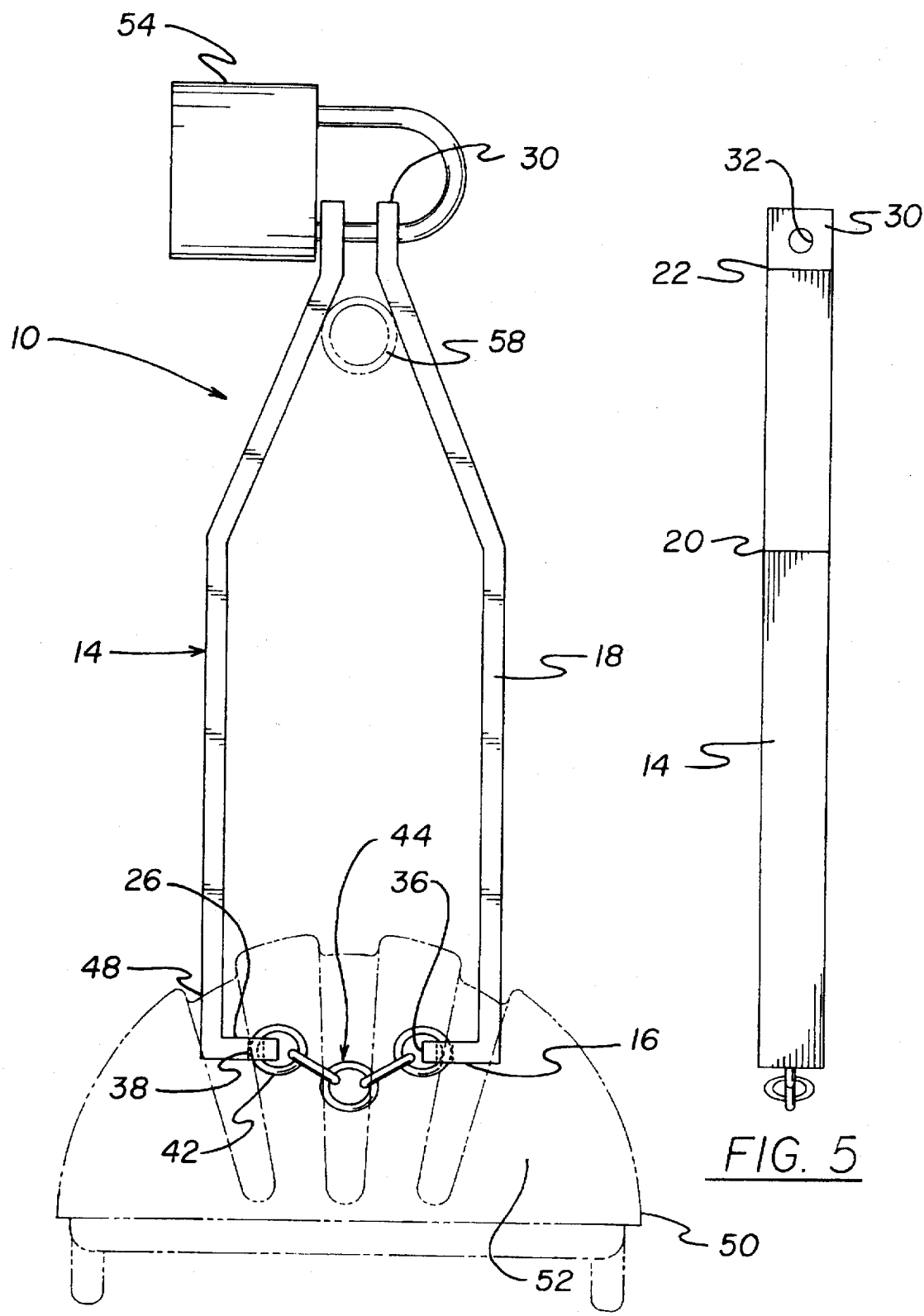

LOCKING DEVICE FOR A HELMET

BACKGROUND OF THE INVENTION

1. Field of the Invention

The present invention relates to a locking device for a helmet and more particularly pertains to providing a T-shaped bar portion that engage a helmet, while being positioned around a bicycle frame, and further capable of receiving a cable lock.

2. Description of the Prior Art

The use of helmet locks is known in the prior art. More specifically, helmet locks heretofore devised and utilized for the purpose of securing helmets onto a bicycle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,117,662 to Holmes discloses a helmet locking device. U.S. Pat. No. Des. 340,320 to Kmata discloses a helmet. U.S. Pat. No. 4,274,271 to Todd and West discloses a helmet locking device. U.S. Pat. No. 4,118,960 to Lipschutz discloses an adjustable locking device immobilized by a safety lock. Lastly, U.S. Pat. No. 4,096,715 to Lipschutz discloses an anti-theft device for a motorcycle helmet.

While these devices fulfill their respective, particular objectives and requirements, the aforementioned patents do not describe a locking device for a helmet that allows bike helmets to be secured to the bicycle frame by utilizing a T-shaped bar portion in combination with the ventilation holes of the helmet, and securing the T-shaped bar portion to the bicycle frame with a padlock.

In this respect, the locking device for a helmet according to the present invention substantially departs from the conventional concepts and designs of the prior art, and in doing so provides an apparatus primarily developed for the purpose of providing a T-shaped bar portion that engage a helmet, while being positioned around a bicycle frame, and further capable of receiving a cable lock.

Therefore, it can be appreciated that there exists a continuing need for a new and improved locking device for a helmet which can be used for providing a T-shaped bar portion that engage a helmet, while being positioned around a bicycle frame, and further capable of receiving a cable lock. In this regard, the present invention substantially fulfills this need.

SUMMARY OF THE INVENTION

In view of the foregoing disadvantages inherent in the known types of helmet locks now present in the prior art, the present invention provides an improved locking device for a helmet. As such, the general purpose of the present invention, which will be described subsequently in greater detail, is to provide a new and improved locking device for a helmet and method which has all the advantages of the prior art and none of the disadvantages.

To attain this, the present invention essentially comprises a T-bar shaped portion has a generally rigid first flat bar with a second flat bar fixedly attached. The first flat bar has a generally rectangular shape with a length of about 6.5 centimeters and a width of about 2.5 centimeters. The second flat bar has a generally rectangular shape with a length of about 9.5 centimeters, and a width equal to the width of the first bar. The length of the second flat bar is one third greater than the length of the first flat bar. The second flat bar is centrally positioned on a top surface of the first bar and integral thereto. The second bar extends outwardly from the first bar in a plane perpendicular the first bar. An opening is positionable through a free end of the second flat bar. The opening has a diameter of about 8 millimeters. Lastly, the free end of the second flat bar is positioned through a ventilation hole of a helmet. The ventilation hole is centrally disposed through a shell of the helmet. The opening within the free end is capable of having a pad lock positioned therethrough for positioning around a bicycle frame. The pad lock is positioned around the bicycle frame when the second flat bar is passed through the ventilation hole of the helmet. Whereby, the helmet is secured to the bicycle frame when the T-bar portion is positioned through the hole of the helmet and lockingly secured to the bicycle frame.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved locking device for a helmet which has all of the advantages of the prior art helmet locks and none of the disadvantages.

It is another object of the present invention to provide a new and improved locking device for a helmet which may be easily and efficiently manufactured and marketed.

It is further object of the present invention to provide a new and improved locking device for a helmet which is of durable and reliable constructions.

An even further object of the present invention is to provide a new and improved locking device for a helmet which is susceptible of a low cost of manufacture with regard to both materials and labor, and which accordingly is then susceptible of low prices of sale to the consuming public, thereby making such locking device for a helmet economically available to the buying public.

Still yet another object of the present invention is to provide a new and improved locking device for a helmet which provides in the apparatuses and methods of the prior art some of the advantages thereof, while simultaneously overcoming some of the disadvantages normally associated therewith.

Even still another object of the present invention is to provide a locking device for a helmet for providing a pair of L-shaped bar portions that engage a helmet, while being positioned around a bicycle frame, and further capable of receiving a cable lock.

Lastly, it is an object of the present invention to provide a new and improved locking device for a helmet including a T-bar shaped portion that has a first flat bar with a second flat bar fixedly attached. The first flat bar has a generally rectangular shape. The second flat bar has a generally rectangular shape with a width equal to the width of the first bar. The length of the second flat bar is one third greater than the length of the first flat bar. The second flat bar is centrally positioned on a top surface of the first bar and integral thereto. An opening is positioned through a free end of the second flat bar. Lastly, the free end of the second flat bar is positioned through a ventilation hole of a helmet. The opening within the free end has a pad lock positioned therethrough for positioning around a bicycle frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the locking device for a helmet constructed in accordance with the principles of the present invention.

FIG. 2 is a frontal view of the present invention as shown in FIG. 1.

FIG. 3 is a side view of the present invention as shown in FIG. 1.

FIG. 4 is a perspective view of an alternative embodiment of the present invention constructed in accordance with the principles thereof.

FIG. 5 is a side view of an alternative embodiment present invention in an operable configuration.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved locking device for a helmet embodying the principles and concepts of the present invention and generally designated by the reference numeral 110 will be described.

The present invention, the locking device for a helmet 110 is comprised of a plurality of components. Such components in their broadest context include a flat bar and a padlock. Such components are individually configured and correlated with respect to each other so as to attain the desired objective.

Specifically, the present invention includes a T-bar shaped 114, as seen in FIG. 1. The T-bar has a generally rigid first flat bar 116 and a second flat bar 118. The first flat bar and the second flat bar each have a generally rectangular shape. The second flat bar is fixedly attached to the first flat bar with a Weld. The first bar, as shown in FIG. 3, has a length of about 6.5 centimeters and a width of about 2.5 centimeters. The second flat bar has a length of about 9.5 centimeters with a width equal to the width of the first flat bar.

The length of the second flat bar is about one third greater than the length of the first flat bar. The T-bar portion is formed of iron or steel for strength. The second bar 118 is centrally positioned on a top surface 122 of the first bar 116, and integral the first bar. The second bar extends outwardly from the first bar 116 in a plan perpendicular the first bar. The second bar has a free end 124 with an opening 126. The opening, as seen in FIG. 2, has a diameter of about 8 millimeters.

Lastly, as shown in FIG. 1, the free end 124, of the second bar, is positioned through a ventilation hole 132 of a helmet 134. The ventilation hole is centrally disposed through a shell 136 of the helmet. The opening 126 of the free end has a padlock 140 positioned therethrough, and around a bicycle frame 142, when the second bar 118 is passed through the ventilation hole of the helmet. Whereby, the helmet 134 is secured to the bicycle frame when the T-bar portion 114, is positioned through the hole the helmet, lockingly secures the helmet to the bicycle frame.

Furthermore, an alternative embodiment 10 is provided. The alternative embodiment includes a pair of L-shaped bar portions 14, as shown in FIG. 4. Each bar portion has a generally rigid first flat bar 16 with an elongated second flat bar 18 that is fixedly attached. Both L-shaped bar portions are formed of iron or steel. Each first bar has a length of about 1.5 centimeters and a width of about 2.5 centimeters. Each flat bar has a first bend 20 and a second bend 22, as shown in FIG. 5. The first bend of each second bar is angled inwardly about 60 degrees, as seen in FIG. 4.

The second bend of each second bar is angled outwardly about 60 degrees. Each bar is preformed with the first and second bends for strength. Each second flat bar, of FIG. 5, has a length of about 15 centimeters with a width equal to the width of the first bar.

As seen in FIG. 4, each second bar 14 extends from a top surface 26 of the first bar 16 and is integral the first bar. Each second bar extends outward from the first bar in a plan perpendicular the first bar. Each second bar has a free end 30 that is near the second bend 22. Each free end, of each second bar, has a second opening passing therethrough. The second opening, as seen in FIG. 5, has a diameter of about 8 millimeters.

Each first bar 16 has a free end 36. The free end, of each first bar, has a first opening 38. Each first opening has a diameter of about 15 millimeters. Each first opening receives a link 42 of a short link chain 44. The chain is formed of an identical metal used to form the bar portions. Using an identical metal allows the chain to be just as strong as the bar portions. The short link chain loosely couples together each first bar, as shown in FIG. 4. Each link, coupled to one of the first openings, is welded closed to ensure the links aren't easily pulled apart and away from the respective free end.

Lastly, each free end 30 of the second bar 18 is positionable through one of a plurality of ventilation holes 48 of a helmet 50. The ventilation holes are predisposed through a shell 52 of the helmet. The ventilation holes come standard within helmets, therefor there is no need to cut a hole for use by the device. Each second opening 32, of each free end of each second bar, has a padlock 54 positioned therethrough when each second bar has been passed through one of the ventilation holes of the helmet. Whereby, the helmet is secured to the bicycle frame 58, when the pair of L-shaped bar portions are positioned through a respective hole of the helmet. The L-shaped bar portions are lockingly secured around the bicycle frame with the helmet.

The present invention is a locking device for a helmet. The present invention is comprised of a T-bar shaped portion. With an increase popularity of cycling and the trend of an increasing number of cyclists wearying helmets, there has been created a need for a device to securely store the helmet to the bicycle. The devices of the present invention make use of the fact most bike helmets have ventilation holes. In the preferred embodiment, a T-shaped bar is passed through the vent hole of a bike helmet and is locked to the bike frame with a security chain or a padlock. In the alternative embodiment, the locking device is a pair of steel bars chained together at one end and passing through the ventilation holes in the helmet and locked together over the bike frame. Each device is very simple to produce and easy to use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved locking device for a helmet for securing the helmet to a bicycle comprising in combination:

a pair of L-shaped bar portions, each bar portion having a generally rigid first flat bar being bent to form an elongated second flat bar integral therewith, each first flat bar having a length of about 1.5 centimeters and a width of about 2.5 centimeters, each second flat bar being extended to having a first bend and a second bend opposite the first flat bar, the first bend of each second flat bar being angled inwardly about 60 degrees, the second bend of each second flat bar being angled outwardly about 60 degrees each second flat bar having a length of about 15 centimeters with a width equal to the width of the first flat bar;

each second flat bar extending from a top surface of the first flat bar and integral thereto, each second flat bar extending outwardly from the first flat bar in a plane perpendicular to the first flat bar, each second flat bar having a free end near the second bend, each free end of each second flat bar having a second opening therethrough, the second opening having a diameter of about 8 millimeters;

each first flat bar having a free end, the free end of each first flat bar having a first opening therethrough, each first opening having a diameter of about 15 millimeters, each first opening receiving therein a link of a short link chain, each short link being formed of metal for strength, each link is positioned within each first opening and is welded closed for retention within each first flat bar respective first opening, each link being permanently coupled within the first free end of each first flat bar the short link chain permanently coupling together each first flat bar of the pair of L-shaped bar portions; and a helmet having a plurality of ventilation holes being disposed through a shell of the helmet, each free end of the second flat bar being positionable through one of the plurality of ventilation holes of a helmet, each second opening of each free end of each second flat bar being capable of receiving a pad lock when each second flat bar having been passed through one of the ventilation holes of the helmet, the short link chain giving the L-shaped bar portions some flexibility when the free ends of each are pulled together for coupling by the pad lock, whereby the helmet is capable of being secured to the bicycle frame when the pair of L-shaped bar portions being positioned through a respective hole of the helmet and lockingly secured around the bicycle frame.

* * * * *